Patented Sept. 13, 1938

2,130,228

UNITED STATES PATENT OFFICE 2,130,228

PRODUCT FOR IMPROVING THE QUALITY OF CAST IRON AND FOR THE MANUFACTURE OF FERROMANGANESE

Henry R. Clarke, Chattanooga, Tenn.

No Drawing. Application March 16, 1936, Serial No. 69,164

5 Claims. (Cl. 75—3)

My invention relates to a method for improving the quality of cast iron and pig iron, and particularly for reducing the sulphur content of both; and wherein the quality of pig iron is improved by auxiliary reduction of one of the ores sometimes used as a part of a blast furnace burden.

One of the object of my invention is to provide, in the reducing of iron ore in a blast furnace, a method in which the manganese ores sometimes employed in the furnacing operation are reduced in process from the dioxide to the monoxide form, or to the metallic state, before contacting with the slag in the furnace.

A still further object of my invention is to provide auxiliary means for reducing manganese ore to the metallic state in a blast furnace or cupola.

Another object of my invention is to provide a method for reducing high oxides of manganese (such as manganese dioxide), when such oxides are used in blast furnaces for increasing the manganese content of pig iron, to either or both manganous oxide or metallic manganese in such a manner as to avoid undue loss of manganese in the slag.

A further object of my invention is to provide a method of refining cast iron by use of fluxing materials which include as an active ingredient manganese in the form of manganous oxide.

A still further object of my invention is to provide, in the reducing of iron ore in a blast furnace, or the refining of pig iron in a cupola, a method in which a slag is formed in process which shall contain manganese as an active ingredient in the form of manganous oxide.

A still further object of my invention is to provide a prepared slag for use in reducing iron ore in a blast furnace or in refining iron in a cupola, which shall contain manganese as an active ingredient in the form of manganous oxide or metallic manganese.

A still further object of my invention is to provide a method of producing a flux adapted to be added to a furnace or cupola charge, which flux when fused shall contain as an active ingredient manganese in the form of manganous oxide.

It is known in the art that if manganese ore containing manganous salts is added to the charge in a cupola, it has the property of reducing the sulphur content of the iron, the sulphur content having been reduced in this manner from .07% to .007%. It has also been observed that if the manganese ore employed in the cupola is in the form of manganese dioxide, the sulphur content of the iron will not be reduced. Manganese ores containing manganous salts are not available in quantities and are accordingly high in price. The more prevalent manganese ores, and consequently those most widely used, are those in which the manganese is in the form of manganese dioxide.

I have noted that pig iron containing defects commonly called "graphite pockets" is consistently produced in blast furnaces in which manganese ore composed largely of the higher oxides of manganese is employed in the furnacing operation. On analyzing the material found in the so-called "graphite pockets", I found it to be magnetic in character, very hard, and to contain a considerable percentage of manganese but practically no carbon. Pig iron containing such pockets makes inferior castings, having undesirable surface conditions, a quality which does not properly take an enamel coating; and further that such castings were often warped, being of a different shape than that of the pattern.

I have also observed that cast iron melted under slag, a constituent of which was manganese ore made up largely of the higher oxides of manganese, contained cavities apparently identical in nature with the so-called "graphite pockets" in pig iron.

In my investigation of means to overcome the foregoing defects, as well as to reduce the sulphur content of iron, I have discovered that the higher oxides of manganese may be reduced to manganous oxide by heating them in intimate association with carbonaceous material. I have brought about such a reduction by forming a slag, preferably basic in character, the initial constituents of the slag containing manganese dioxide in finely divided form, in intimate association with the carbonaceous material.

The carbonaceous material is preferably one rich in hydrogen, such as powdered coal, sawdust, tar or similar bituminous substance, molasses, flour, starch, sugar, or any other finely divided or liquid carbonaceous substance. Where ore is reduced, or iron is melted under such a slag, it should be of a superior quality, of uniform grain structure, and free from defects such as have been hereinbefore enumerated.

I have further observed that manganese ore containing large percentages (around 60%) of manganese dioxide, melts at a relatively low temperature (about 2500° F.), forming a syrup-like slag which does not attack acid materials such as fire clay. I have also observed that said manganese ore slag will not adhere to coke, their relationship being somewhat like the relationship between oil-covered solid matter and water.

It could not be expected that oxides incorporated in slag with the above properties would be readily reduced either by the reducing gases in a blast furnace or by direct contact with coke. It however would be expected that such a slag (being acid in character) would be readily absorbed by basic blast furnace slag and become an integral part of the latter slag. Thus the introduction into a blast furnace of high oxides of manganese without auxiliary means of reducing said oxides, would be expected to result in manganese being expelled from the blast furnace as a constituent of the slag rather than as an alloy of the iron or as ferro-manganese.

I have further observed that if coal or other carbonaceous matter rich in hydrogen is intimately mixed with manganese ore containing manganese dioxide, a large percentage of the manganese in the ore is reduced to metallic manganese when the mixture is brought to a temperature of about 2650° F.

Upon heating coal or other carbonaceous substances rich in hydrogen, such as hereinbefore enumerated, with manganese ore containing manganese principally in the form of manganese dioxide, I have noted that, contrary to its action with coke, the ore, when fused, has a tendency to adhere to, or to wet the carbonaceous material, which facilitates the intimacy necessary for prompt and proper reduction of the ore when they are heated together. It also facilitates the forming or briquettes or sinter, as will hereinafter be pointed out.

The slag may be formed in process in the furnacing of iron ore or in the melting of iron, or it may be prepared separately and added to the furnace or cupola charge. If formed in process, the constituents are preferably charged into the furnace in cans or other suitable containers so as to maintain the constituents in intimate association until the desired reduction of the manganese ores has taken place.

The constituents may also be mixed and brought to a high temperature in order to form sinter or clinker for charging into the furnace or cupola, to be further reduced by the heat in the furnacing operation. Also the constituents may be melted in a furnace or cupola separate from the iron to produce a molten slag which may be solidified and used when convenient in furnace or cupola operations. Also the constituents may be formed into briquettes by first mixing them with suitable binding materials, such as cement or sodium silicate, and then molding or pressing the materials into shapes and sizes suitable for charging into furnaces.

There is preferably mixed with the carbonaceous material and manganese ore some basic material, such as lime, dolomite, or soda ash, when the manganese ore contains siliceous matter sufficient to render the fused mixtures acid in character. I have found that slags acid in character are not so effective in overcoming the defects heretofore mentioned.

I have found that a mixture of finely divided manganese ore (20% to 60% $MnO_2$) and powdered coal in the proportions of 80% manganese ore to 20% coal, when heated, form suitable sinter or clinker. These proportions may, of course, be varied considerably, and limestone, or other basic materials, may be added thereto. For example, a mixture of 70% manganese ore, 20% coal, and 10% limestone, may be employed as slag forming material for use in a blast furnace. Mixtures for use in a blast furnace should have a high fusion point so as not to be absorbed by the other slag in the furnace before coming in contact with the iron. This high fusion point is best attained by the addition of limestone, as above set forth.

An example of a mixture suitable for making a slag basic in character for use in a cupola is as follows:

| | Percent |
|---|---|
| Manganese ore | 50 |
| Soda ash | 10 |
| Limestone | 25 |
| Fluor spar | 5 |
| Coal | 10 |

Slags may be produced from mixtures such as the foregoing by fusing in a furnace or cupola separately, and when drawn off from the furnace chilled in water to form relatively small fragments; or it may be run into molds to form briquettes of the desired size. This slag may be then employed as a part of a furnace or cupola charge.

For producing a slag of the desired character, other combinations will readily suggest themselves to those skilled in the art, bearing in mind that the result sought, in accordance with this invention, is the reduction of the higher oxides of manganese to the manganous or metallic state in such a manner that the manganese shall be available, when needed, and that there should be sufficient carbonaceous material maintained in intimate contact with the manganese dioxide content of the mixture until heated to a sufficiently high temperature to reduce the manganese dioxide to the manganous or metallic state. I have found that this requires a temperature of around 2500° F.

In furnacing operations, to reduce the sulphur content of the iron and improve its quality, from 20 to 60 pounds of my improved mixture is added to a furnace or cupola per ton of iron. In blast furnace operations, the amount employed would be greater and would vary according to the desired manganese content of the iron. In some cases it might be found that the iron ore contains sufficient manganese to supply the manganese content of the iron. In such cases from 20 to 60 pounds of the flux or slag would be added solely for the purpose of reducing sulphur.

While I have described several ways of carrying out my invention, it will be obvious to those skilled in the art that it is not so limited, but that various means and proportions will suggest themselves to those skilled in the art. I desire, therefore, that only such limitations shall be placed thereupon as are imposed by the prior art or as are specifically set forth in the appended claims.

What I claim is:

1. A material in the form of sinter or clinker for adding to a blast furnace or cupola burden to improve the quality of the iron or to produce metallic manganese or ferro-manganese, comprising manganese ore containing manganese principally in the form of manganese dioxide, and carbonaceous material containing effective amounts of hydrocarbons and possessing the property of adhering to the manganese ore during its reduction and in an amount sufficient to reduce the manganese ore.

2. A material for adding to a blast furnace or cupola burden to improve the quality of the iron or to produce metallic manganese or ferro-manganese comprising manganese ore containing manganese principally in the form of manganese dioxide and hydrogenous carbonaceous material in an amount sufficient to reduce the manganese to a metallic state, and a binding agent, in the form of briquettes, said carbonaceous material having the property of being wet by, or of clinging to, molten slags or ores containing manganese.

3. A material for adding to a blast furnace or cupola charge to improve the quality of iron or to produce metallic manganese or ferro-manganese comprising manganese ore containing manganese principally in the form of manganese dioxide and hydrogenous carbonaceous material in finely divided form and in sufficient quantity to reduce the manganese to a metallic state, and means for holding said components in intimate association until a reducing temperature has been attained, said carbonaceous material having the property of adhering to or being wet by the manganese ore.

4. A material for adding to a blast furnace or cupola charge to improve the quality of the iron or to produce metallic manganese or ferro-manganese comprising finely divided manganese ore containing manganese principally in the form of manganese dioxide and a finely divided hydrogenous carbonaceous substance having the property of being wet by said ore when the latter is fused, and in sufficient quantity to reduce the manganese to a metallic state, and means for holding said substances in intimate association until a reducing temperature has been attained.

5. A mixture for adding to a blast furnace or cupola burden to produce a basic slag containing manganese in a manganous or metallic state when heated to a reducing temperature, comprising manganese ore containing manganese principally in the form of manganese dioxide, sufficient hydrogenous carbonaceous material to reduce said ore, a basic material in sufficient quantity to render slag formed from said mixture basic in character, said carbonaceous material having the property of clinging to and remaining with the ore while the latter is in the process of changing from solid to the liquid state and is being reduced, and means to hold the components of the mixture in intimate relation until a reducing temperature has been attained.

HENRY R. CLARKE.